(No Model.)

B. T. BABBITT.
ROTARY ENGINE.

No. 305,656.   Patented Sept. 23, 1884.

Witnesses:
C. E. Lundgren
Louis W. Whitehead.

Inventor:
Benjamin T. Babbitt
by his Attys.
Brown & Hall

N. PETERS, Photo-Lithographer, Washington, D. C.

UNITED STATES PATENT OFFICE.

BENJAMIN T. BABBITT, OF NEW YORK, N. Y.

ROTARY ENGINE.

SPECIFICATION forming part of Letters Patent No. 305,656, dated September 23, 1884.

Application filed May 7, 1884. (No model.)

*To all whom it may concern:*

Be it known that I, BENJAMIN T. BABBITT, of the city and county of New York, in the State of New York, have invented a new and useful Improvement in Rotary Engines, of which the following is a specification.

The invention relates to those engines which comprise the combination with two parallel and concentric disks arranged to rotate in opposite directions, and provided with circular series of vanes or buckets in the same plane, the series of vanes or buckets on one disk being arranged in a circle of smaller diameter, so as to fit within the series of vanes or buckets on the other disk, and the vanes or buckets of the two series being concaved or curved in opposite directions, and a tangential jet or nozzle arranged to discharge the motive agent directly against the vanes or buckets of the outer series.

The invention consists in the combination, with the above-described disks, with their vanes or buckets and the jet or nozzle, of a novel arrangement of gearing, whereby the disks and their shafts, rotating in opposite directions, will transmit their combined power to a single shaft, as more fully hereinafter described.

Figure 1:
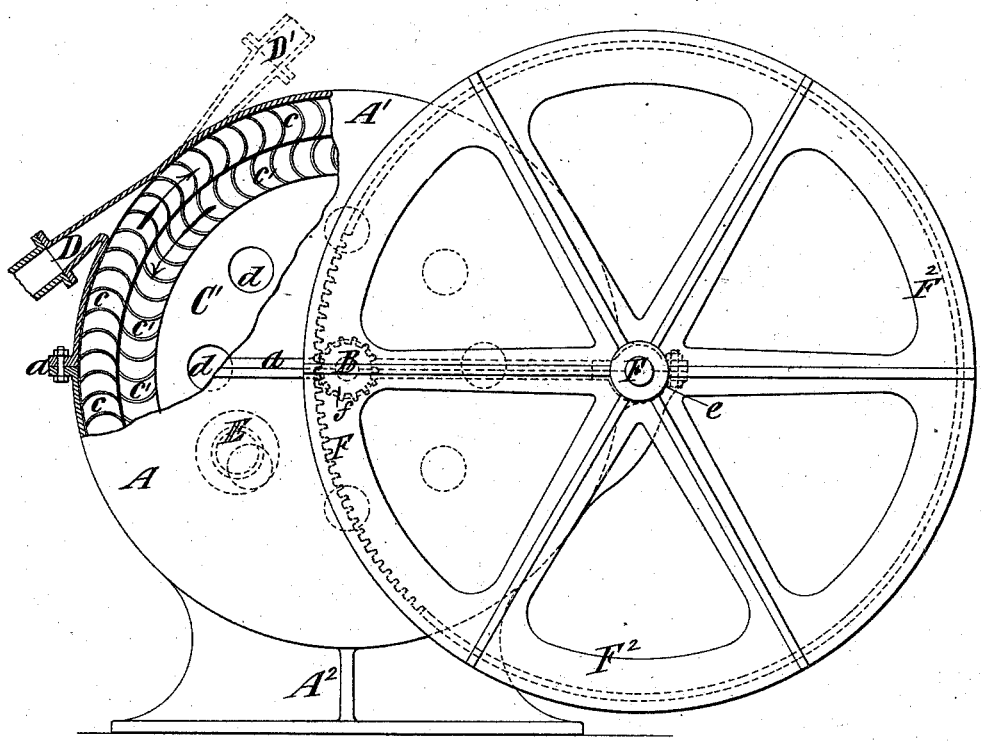
Figure 2:
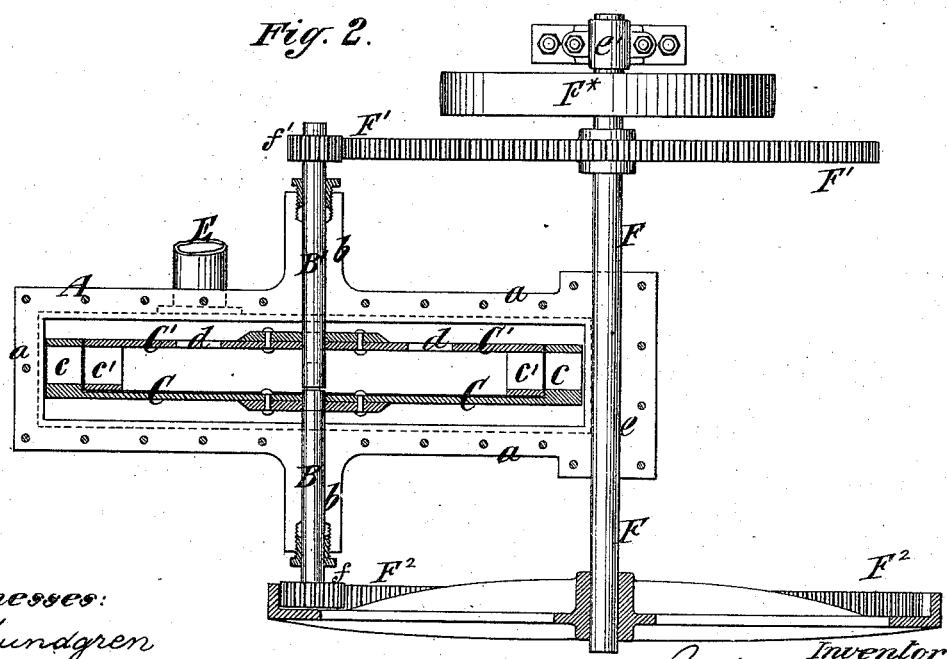

In the accompanying drawings, Figure 1 is a partly sectional side view of an engine embodying my invention, and Fig. 2 is a horizontal section in a plane concentric with the center of the engine.

Similar letters of reference designate corresponding parts in both figures.

A A' designate the case of the engine, which consists of two semicircular portions, the lower one, A, being provided with a foot or base portion, A². The two parts of the case are joined by flanges a, bolted together, and concentric therewith are two shafts, B B', which are supported in bearings b, formed in the case, and which are preferably fitted together at their adjacent ends by a projection or prolongation of one entering a hole or socket in the end of the other, as shown in Fig. 2. This connection between the shafts aids in holding them in line, but does not in any way interfere with their rotation in opposite directions. On the two shafts are secured fast two disks, C C', the former being of largest diameter, and on the adjacent faces of these disks are two circular series of buckets or vanes, c c'. The series of buckets or vanes c' on the disk C' are arranged in a circle of smaller diameter than the buckets or vanes c and fit within the latter, as most clearly shown in Fig. 2, the two series being in the same vertical plane.

With the upper part, A', of the case is connected a jet-nozzle, D, for steam or other motive agent, which is tangential to the circular series of buckets or vanes c, and the steam or other motive agent issuing from the nozzle D, and acting on the buckets or vanes c of the series which are upon the disk C, turns the latter in the direction of the arrow thereon in Fig. 1, and then, reacting on the vanes or buckets c' on the disk C', turns the latter in the reverse direction, as also indicated by arrows in Fig. 1. After performing its duty in turning the disks, the steam or other motive agent escapes from between the disks through holes d in the disk C', and is exhausted from the case A A' through the pipe E.

I have indicated by dotted lines D' a nozzle for admitting steam to reverse the engine.

F designates a main shaft, which is mounted in bearings e e', the former of which is formed in the case A A' of the engine. The shaft B' is geared with the shaft F by a pinion, f', and spur-wheel F', and the shaft B is geared with the shaft F by a pinion, f, and an internal gear-wheel, F². By this mechanism the motion of the shafts B B' in reverse directions transmits power to turn the shaft F in one direction only, and power may be taken from a pulley, F³, on the shaft F.

What I claim as my invention, and desire to secure by Letters Patent, is—

The combination, with the shafts B B', the disks and series of buckets C c C' c', and the nozzle D, of the shaft F, the pinion f' and spur-wheel F', gearing the shaft B' with the shaft F, and the pinion f and internally-toothed wheel F², gearing the shaft B with the shaft F, all substantially as herein described.

B. T. BABBITT.

Witnesses:
  E. F. GIBBON,
  EDWARD R. BARTON.